United States Patent [19]

Vosburgh

[11] 4,412,877
[45] Nov. 1, 1983

[54] EMBOSSING SECONDARY BACKINGS OF CARPETS

[75] Inventor: William G. Vosburgh, West Chester, Pa.

[73] Assignee: E. I. Du Pont de Nemours & Co., Wilmington, Del.

[21] Appl. No.: 370,394

[22] Filed: Apr. 21, 1982

Related U.S. Application Data

[63] Continuation-in-part of Ser. No. 251,987, Apr. 6, 1981, abandoned.

[51] Int. Cl.$^3$ ............................ A46D 1/00; B32B 5/00
[52] U.S. Cl. .......................................... 156/72; 28/159; 156/64; 156/148; 156/209; 156/220; 156/229; 156/435; 156/553; 428/95; 428/96; 428/172; 428/235
[58] Field of Search ............... 156/64, 220, 72, 229, 156/148, 435, 209, 553; 428/95, 172, 96, 235; 28/159; 264/284

[56] References Cited

U.S. PATENT DOCUMENTS

| 2,700,205 | 1/1955 | Rice | 156/209 |
|---|---|---|---|
| 2,999,297 | 9/1961 | Schwartz | 428/95 |
| 3,052,947 | 9/1962 | Field. | |
| 3,176,058 | 3/1965 | Mittman | 156/209 |
| 3,264,147 | 8/1966 | Sands | 428/96 |
| 3,264,167 | 8/1966 | Sands | 428/96 |
| 3,293,104 | 12/1966 | Hull | 156/229 |
| 3,322,607 | 5/1967 | Jung | 428/96 |
| 3,414,458 | 12/1968 | Lacy | 428/96 |
| 3,549,470 | 12/1970 | Greenwald et al. | 428/95 |
| 3,554,824 | 1/1971 | Callahan | 156/72 |
| 3,616,138 | 10/1971 | Wentworth | 428/96 |
| 3,698,973 | 10/1972 | Wisotzky et al. | 156/209 |

FOREIGN PATENT DOCUMENTS 1268117 3/1972 United Kingdom.
1099844 1/1978 United Kingdom.

OTHER PUBLICATIONS

Typar ® Spunbonded Polypropylene for Primary Carpet Backing Bulletin S-12, May 1974.
Research Disclosure, Item 12209, "Process for Jute-on-Jute Carpet Substitute", Jun. 1974.

Primary Examiner—John J. Gallagher

[57] ABSTRACT

An improved process is provided for making tufted carpets having bonded nonwoven fabric secondary backings. After the secondary backing has been laminated to a back-sized and tufted primary backing to form a carpet composite, the composite is passed through a nip to emboss the secondary backing and provide a less stiff, easier to install carpet.

4 Claims, 2 Drawing Figures

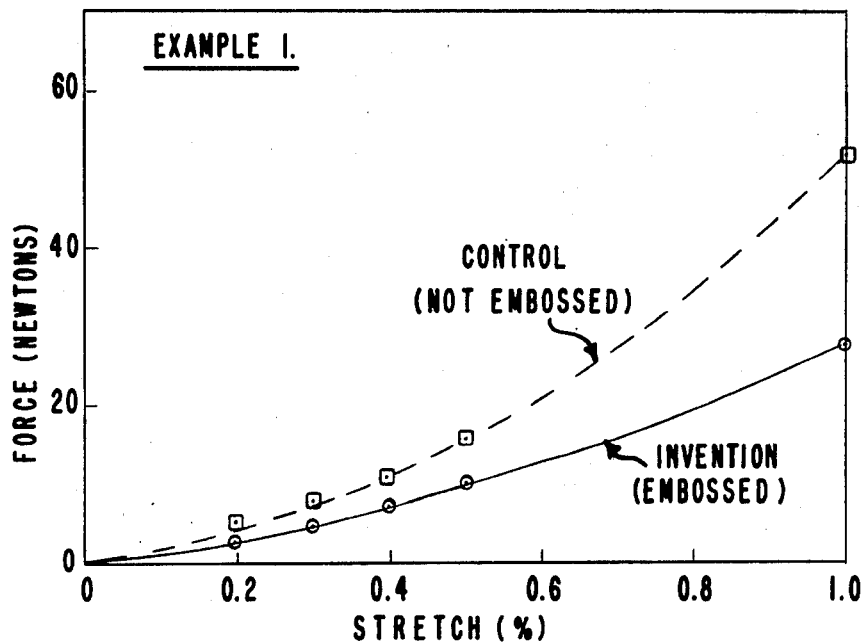
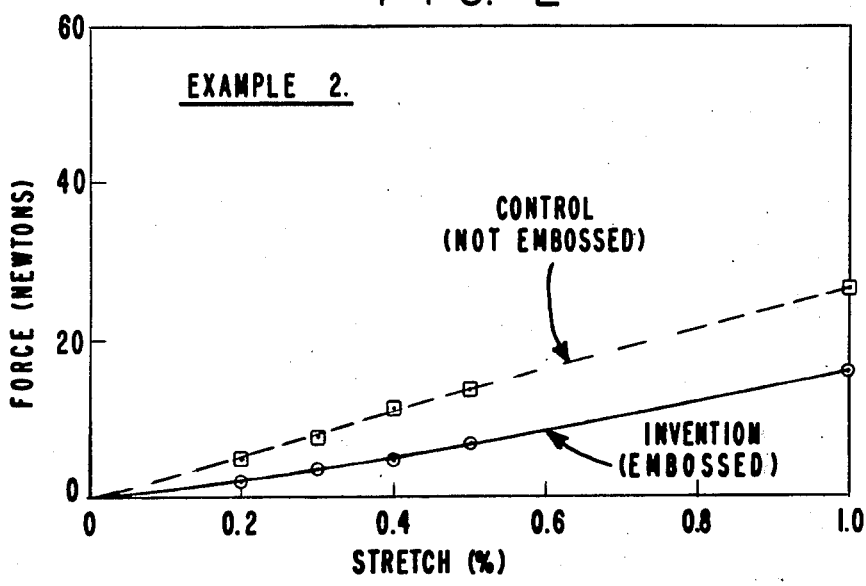

EMBOSSING SECONDARY BACKINGS OF CARPETS

CROSS REFERENCE TO PRIOR APPLICATION

This application is a continuation-in-part of pending application Ser. No. 251,987, filed Apr. 6, 1981, now abandoned.

BACKGROUND OF THE INVENTION

1. Field of the Invention

This invention relates to a process for preparing a tufted carpet which has a nonwoven fabric secondary backing. More particularly, the invention concerns the embossing of the secondary backing after the secondary backing has become an integral part of the carpet. Such embossing provides a more stretchable carpet for easier installation.

2. Description of the Prior Art

Processes for manufacturing tufted carpets are well-known in the art. In such processes, a woven or a nonwoven fabric, called a primary backing, is tufted with yarns which form the face pile of the carpet. A latex or a melt adhesive, often referred to as a "back-size" is then applied to the back of the primary backing to anchor the base of the pile yarn tufts in the primary backing. Usually, a secondary backing is then laminated to the back-sized surface of the primary backing. The process can also include additional steps such as dyeing, shearing, heat setting, and so forth.

A process similar to the ones just described is disclosed in U.S. Pat. No. 3,322,607. This patent also discloses the use of a secondary backing in the form of a self-bonded nonwoven fabric made from thermoplastic fibers. Embossed secondary backings of this type are disclosed in U.S. Pat. No. 3,414,458. Note that the embossing is carried out before the secondary backing is attached to the back-sized, tufted primary backing.

Tufted carpets made by the above-described processes have been widely used throughout the world. Generally, such carpets are installed with an initial stretch of at least about 0.2%, preferably about one-half to one percent when used wall-to-wall in large rooms. This initial stretch is desired to avoid carpet-distortion problems induced by subsequent temperature and humidity changes in the room. However, the present inventor found that when the secondary backing of the tufted carpet was a bonded nonwoven fabric, especially one made from filaments of polypropylene or polyester, the completed carpet frequently was stiffer than desired for easy wall-to-wall installation in large rooms and often required the use of power stretchers rather than knee-kick stretchers to obtain the desired initial stretch.

SUMMARY OF THE INVENTION

The present invention provides an improved process for preparing a tufted carpet that is less stiff and easier to install. The process is of the general type wherein a primary carpet backing is tufted, back-sized and then laminated to a bonded nonwoven fabric secondary backing to form a carpet composite. The improvement of the present invention comprises embossing the secondary backing, after it is an integral part of the carpet composite, at a temperature and under a load such that an embossed pattern is formed in the secondary backing and the force required to stretch the carpet composite one-half percent is decreased to less than 70% of the force required prior to the embossing step. Generally, the embossing is performed by passing the carpet composite through a nip formed by an embossing roll and a back-up roll, the secondary backing contacting the embossing roll in the nip. Usually, temperatures in the range of 90° to 200° C., nip loads in the range of 90 to 1800 newtons per centimeter and speeds of the composite through the nip in the range of 0.5 to 40 meters per minute are useful in the process of the invention. A preferred embossing step imparts a woven appearance to the secondary backing and decreases the force required for a one-half percent stretch to less than 60%. In another preferred embodiment, the carpet composite is passed through two nips, located 180 degrees apart on the lateral face of an embossing roll, neither nip being heated.

BRIEF DESCRIPTION OF THE DRAWING

The attached FIGURES illustrate the reductions achieved in the force required to stretch the carpets made in Examples 1 and 2 in accordance with the present invention.

DETAILED DESCRIPTION OF PREFERRED EMBODIMENTS

The embossing step of the improved process of the present invention can be employed as an intermediate step in the tufted-carpet manufacturing process or as an additional step after the tufted carpet has been completed otherwise. The process generally includes a sequence of steps in which a primary backing fabric is tufted with yarns that become the face pile of the carpet, the back of the primary backing is then back-sized with a latex or melt adhesive to lock the base of the tufts in the primary backing and then a bonded nonwoven fabric secondary backing is laminated to the back-sized face of the tufted primary backing. As a result of this sequence of steps, a "carpet composite" is formed. As used herein, the term "carpet composite" can mean the immediate product of the just-described steps as well as such a product which has been subjected to additional carpet finishing steps, such as dyeing, heat setting, shearing and so forth. The process of the invention is applicable with a wide variety of tufted carpet constructions, insofar as the type of pile yarns, back-sizing or primary backing is concerned. The number of tufts per unit length or width also does not substantially affect the applicability of the improvement of the present invention.

According to the improvement of the present invention, the bonded nonwoven fabric secondary backing is embossed after the carpet composite has been formed. A flat press can be used to perform the embossing. However, for continuous operation, the embossing preferably is performed in the nip formed by an embossing roll and a back-up roll. In passing through the nip, the secondary backing face of the composite is in contact with the embossing roll while the pile face contacts the back-up roll. The conditions of embossing are controlled so that an embossed pattern is formed in the secondary backing and the force required to stretch the carpet composite one-half percent is decreased to less than 70%, preferably to less than 60%, of the force required prior to the embossing step.

The conditions of importance to the embossing of the secondary backing as it passes as part of the carpet composite through the nip, for a given embossing pattern, include the temperature of the secondary backing, the load impressed upon the composite and the speed of the composite through the nip.

The range of conditions generally suitable for use in the embossing step of the present invention include:

| | |
|---|---|
| Temperature | 90–200° C. |
| Nip load per unit width of carpet | 90–1800 N/cm |
| Speed | 0.5–40 m/min. |

When operating within these ranges, one usually employs the higher speeds with the higher temperatures and the higher nip loads. At the lower speeds, the lower temperatures and the lower nip loads can provide satisfactory results. For maximum economy, high speeds and temperatures as high as practicable with the material of the secondary backing are preferred. Melting or excessive softening of the secondary backing should be avoided during the embossing. Accordingly, when a bonded nonwoven fabric secondary backing made from polypropylene filaments is included in the carpet composite, temperatures above 175° C. usually are avoided. The preferred range of temperatures for embossing such secondary backings of polypropylene is 140° to 175° C. Similarly, when the nonwoven fabric secondary backing is made from polyester filaments, temperatures above 190° C. are usually avoided, and the preferred range of embossing temperatures is 160° to 190° C.

A particularly useful method for carrying out the embossing in accordance with the present invention involves the use of two nips which are formed by one embossing roll and two back-up rolls. The back-up rolls are located on opposite sides of the lateral surface of the embossing roll (i.e., 180 degrees apart). When the carpet composite is passed through these two nips, the secondary backing face of the composite remains in contact with the embossing roll from the point of entry into the first nip to the point of exit of the second nip. In this manner, no misalignment of the embossing pattern and insignificant cooling of the secondary backing occur during the embossing. Also, the use of this two-nip procedure facilitates the embossing of very wide carpet composites and permits the employment of higher speeds at lower temperatures and loads, than can be employed satisfactorily with a single nip. Furthermore, embossing steps, which in one-nip procedures often require heating of the embossing rolls, can be carried out without heating when the two-nip procedure is used.

It is preferred to perform the embossing step in line with the usual carpet finishing steps. A most convenient point in the process is after the secondary backing has been laminated to the back-sized tufted primary backing and the thusly formed composite is emerging from a conventional drying oven. At this point, the temperature of the secondary backing is usually well over 90° C. If desired, the temperature can be increased further by use of additional heaters, or other conventional means. Also, the embossing roll itself can be heated.

Numerous embossing patterns are suitable for use in the improved process of the present invention. Steel embossing rolls having numerous bosses of triangular, diagonal, circular, pyramidal, square, rectangular or special cross section can be used. Some embossing patterns can be used to impart a woven appearance to the secondary backing, as well as to provide the desired decrease in stiffeners. The embossing also imparts a less blotchy appearance to the nonwoven fabric secondary backing as well as a softer and less papery hand.

The reduction in force required to stretch the carpet composite is measured with an Instron tester in accordance with ASTM-D-1682-64, but with a cross head speed of 0.5 inch/min. (1.27 cm./min.), a gauge length of 5 inches (12.7 cm.), a "CT" tensile load cell, rubber-faced clamps of 3-inch (7.62-cm.) width and a 3-inch (7.62-cm.) wide by 8-inch (20.3-cm.) long specimen. In this application, the force required to stretch the specimen is recorded to newtons. For the purpose of this measurement the specimen is cut and tested in the lengthwise (machine direction) of the carpet.

It should be noted that the method of embossing the secondary backing while it is part of the carpet composite, as required by the present invention, significantly reduces the force required to stretch the carpet. In contrast, a secondary backing that is embossed prior to being laminated to the back-sized tufted primary backing does not provide such a reduction in force. In each case, the comparison is with a carpet that has a similar secondary nonwoven fabric backing which has not been embossed.

The invention is further illustrated, but not intended to be limited, by the following examples, in which the forces required to stretch carpet composites are dramatically reduced by the embossing of the secondary backings while an integral part of the carpet composite.

EXAMPLE 1

A 3.7-meter (12-foot) wide, tufted carpet was treated in accordance with the present invention. The carpet had a 108-g/m$^2$ (3.2-oz/yd$^2$) woven polypropylene primary backing (i.e., "Polybac" manufactured by Amoco Fabrics Co.). The primary backing was tufted with a nylon carpet yarn which formed 1.26 rows per centimeter containing 2 tufts per centimeter and provided 848 g/m$^2$ (25 oz/yd$^2$) of cut pile nylon tufts. The carpet yarn was a 3700-denier (4200-decitex) Type 876 nylon yarn (manufactured by E. I. du Pont de Nemours and Company). The carpet included about 710 g/m$^2$ (21 oz/yd$^2$) of a dried, commercial, carboxylated styrene/butadiene, filled latex. The latex (manufactured by Reichhold Chemical Co.) contained 78% solids (4.5 parts of clay filler per part of carboxylated styrene/butadiene resin) and had a viscosity in the range of 10,000 to 12,000 centipoise. The carpet also included a bonded nonwoven secondary backing made from polypropylene filaments (Typar ® spunbonded polypropylene manufactured by E. I. du Pont de Nemours and Company) which weighed 54.2 g/m$^2$ (1.6 oz/yd$^2$).

The above-described carpet composite was treated in accordance with the present invention in order to emboss its secondary backing. A length of nontreated carpet (i.e., with its secondary backing not embossed) was retained as a "control" for comparison purposes. The 3.7-m wide carpet was passed at 0.9 meter/min. (3 feet/min.) through the 4.6-m (15-foot) wide nip of an embossing calendar having an internally heated, 23-cm (9-inch) diameter, steel embossing roll and an 18-cm (7-inch) diameter, steel, smooth, back-up roll. The embossing roll was heated to 149° C. (300° F.). In passing through the nip, the pile surface of the carpet was in contact with the back-up roll, while the secondary backing was in contact with the heated embossing roll. The surface of the embossing roll contained 0.8 bosses/cm$^2$, each boss being in the approximate form of a rectangular prism of square cross section (7.9 mm × 7.9 mm) and 3.2 mm height, located center-to-center 11.1 mm apart. The load applied to the carpet composite across its 3.7-m width as is passed through the nip of the calender was 175 N/cm of width.

As a result of this embossing treatment of the carpet, the secondary backing acquired a patterned surface and exhibited less blotchiness and paperiness than the retained nonembossed control. The forces required to stretch the embossed carpet and its nonembossed control were measured. The data, which are summarized in the Table I below and are plotted in the attached figure, show that the force required to stretch the carpet one-half percent after the embossing treatment was 66% of the force required before embossing.

EXAMPLE 2

A 3.7-meter (12-foot) wide, tufted carpet was treated by the two-nip embossing procedure of the present invention. As in Example 1, the carpet had a 108-g/m$^2$ (3.2-oz/yd$^2$) woven polypropylene primary backing (i.e., "Polybac" manufactured by Amoco Co.). The primary backing was tufted with a 2-ply, 6000 denier, heat-set, nylon carpet yarn which formed 1.05 rows per centimeter containing 3.3 tufts per centimeter and provided 882 g/m$^2$ (26 oz/yd$^2$) of cut pile nylon tufts. The tufted primary backing was Kuester-dyed and then back-sized with about 746 g/m$^2$ (22 oz/yd$^2$) on a dry basis of a commercial, carboxylated styrene/butadiene, filled latex. The latex was applied in equal amounts from two pans. The latex in the first pan contained 78% solids comprised of 8 parts of clay filler per part of carboxylated styrene/butadiene resin and in the second pan, 4 parts clay per part resin. Each latex had a viscosity in the range of 10,000 to 12,000 centipoise. The carpet also included a bonded nonwoven secondary backing made from polypropylene filaments (Typar ® spunbonded polypropylene manufactured by E. I. du Pont de Nemours and Company) which weighed 54.2 g/m$^2$ (1.6 oz/yd$^2$). Note that this carpet, because of its construction, was less stiff and easier to stretch than the carpets of Example 1.

The above-described carpet composite was treated in accordance with the present invention in order to emboss its secondary backing. A length of nontreated carpet (i.e., with its secondary backing not embossed) was retained as a "control" for comparison purposes. The 3.7-m wide carpet composite was passed at 12.2 meter/min. (40 feet/min.) through an embossing calender having two 4.1-m (160-inch wide nips formed by a steel embossing roll having a 14.5-cm (5.7-inch) diameter and two 15.2-cm (6-inch) diameter smooth steel back-up rolls. The rolls were not heated. The back-up rolls were located 180 degrees apart with respect to the cylindrical (lateral) surface of the embossing roll. In passing through the nips, the pile surface of the carpet was in contact with the back-up rolls, while the secondary backing was in contact with the embossing roll. The surface of the embossing roll contained 9.9 bosses/cm$^2$, each boss being in the approximate form of a rectangular prism of square cross section (0.8 mm × 0.8 mm) and 2.6 mm height, located center-to-center 3.2 mm apart. The load was transmitted to the carpet composite by eight equally spaced air cylinders which were fixed to a steel beam and exerted a downward force through twelve equally spaced pairs of 8.9-cm (3.5-inch) diameter by 15.2-cm (6-inch) long urethane-covered rolls to the upper back-up roll. The lower back-up roll was supported by twelve identical pairs of urethane covered rolls. A load of 443 N/cm (253 lb/linear inch) and of 485 N/cm (277 lb/linear inch) was applied to the upper and lower nips, respectively.

As a result of this embossing treatment of the carpet, the secondary backing acquired a patterned surface and exhibited less blotchiness and paperiness than the retained nonembossed control. The forces required to stretch the embossed carpet and its nonembossed control were measured. The data, which are summarized in Table I below, show that the force required to stretch the carpet one-half percent after the embossing treatment was 50% of the force required before embossing.

TABLE I

| | Force Required to Stretch Specimen, Newtons | | | |
| --- | --- | --- | --- | --- |
| | Example 1 | | Example 2 | |
| % Stretch | Sample | Control | Sample | Control |
| 0.2 | 3.3 | 5.2 | 2.0 | 4.9 |
| 0.3 | 5.1 | 8.0 | 3.5 | 7.9 |
| 0.4 | 7.5 | 11.3 | 4.8 | 10.9 |
| 0.5 | 10.5 | 15.8 | 6.7 | 13.5 |
| 1.0 | 27.6 | 51.9 | 15.9 | 26.5 |

EXAMPLE 3

This example illustrates the advantage of the present invention in providing a carpet which is significantly less stiff and easier to install than carpets whose nonwoven fabric secondary backings are not embossed or are "pre-embossed" (i.e., embossed before lamination to the back-sized tufted primary backing, rather than after lamination as required by the present invention).

A tufted primary backing was prepared as in Example 2. Three pieces, each measuring 20.3 cm by 20.3 cm (8 in. by 8 in) were cut from the tufted primary backing. These pieces were used to perform three tests. In each test, one piece of the tufted primary backing was back-sized with a commercial, carboxylated styrene/butadiene, filled latex and a nonwoven fabric secondary backing was laminated thereto. The latex was applied in an amount equal to about 1 kg/m$^2$ (30 oz/yd$^2$) on a dry basis. The latex comprised 4.25 parts clay per part resin, contained 82% solids and had a viscosity of 10,000 to 12,000 centipoise. The secondary backing was made of the same material as in Examples 1 and 2 (i.e., 54.2 g/m$^2$ spunbonded polypropylene nonwoven fabric). The secondary backing was laminated to the back-sized tufted primary backing by laying the secondary backing onto the wet latex of the back-sized surface and rolling a smooth, 3.4-kg, 4.4-cm diameter cylinder over the secondary backing. The thusly formed assembly was then placed for 20 minutes in a forced draft oven operating at 135° C. (275° F.) to dry and cure the latex and to form a carpet composite. The three tests differed from each other in that the secondary backing in Test A was not embossed; in Test B, was pre-embossed (i.e., before lamination); and in Test C, was embossed in accordance with the present invention (i.e., after lamination) to the back-sized, tufted, primary backing. Further details of the test are as follows.

Test A (Comparison)

A sample of carpet composite was prepared as described above with a secondary backing that was not embossed. Test B (Comparison)

A sample of carpet composite was prepared as described above with a pre-embossed secondary backing.

The secondary backing was pre-embossed in a laboratory hydraulic press. The press had two flat platens. A patterned, 0.6-cm (¼-in) thick aluminum plate rested on the lower platen and acted as the embossing member. The plate had 9.9 symmetrical pyramidal bosses per square centimeter (64 per in$^2$). The bosses were about 3-mm (⅛-in) deep and located on 3-mm (⅛-in) centers. The secondary backing was placed atop the patterned plate; a 6.4-mm thick sheet of 80 durometer hardness neoprene rubber sheet was placed atop the secondary backing; the platens were heated to 100° C.; and a pressure of 2.16 megapascals (312.5 psi) was applied to the backing for 5 seconds.

Test C (in accordance with the invention)

A sample of carpet composite was prepared as described above and the secondary backing was embossed in the same press, with the same embossing plate and under the same conditions as in Test B.

The results of these tests, which are summarized below in Table II, show that the force required to stretch by ½% the carpet specimen prepared in accordance with the present invention (Test C) was approximately 35% of the force required to stretch the carpet specimens made with the non-embossed nonwoven fabric secondary backing (Test A) and 48% of the force required to stretch by ½% the carpet specimens made with the pre-embossed nonwoven fabric secondary backing (Test B).

TABLE II (Example 3) Force Required to Stretch Specimen, Newtons

| % Stretch | Comparison | | Invention C. Embossed |
|---|---|---|---|
| | A. Not Embossed | B. Pre-Embossed | |
| 0.2 | 5.3 | 4.0 | 1.3 |
| 0.3 | 8.9 | 6.2 | 2.7 |
| 0.4 | 12.0 | 8.9 | 3.6 |
| 0.5 | 15.1 | 11.1 | 5.3 |
| 1.0 | 30.7 | 24.9 | 13.8 |

I claim:

1. In a tufted-carpet process wherein a primary backing is tufted, back-sized and then laminated to a bonded, nonwoven fabric, secondary backing to form a carpet composite, the improvement comprising embossing the secondary backing after it has become an integral part of the carpet composite at a temperature and under a load such that an embossed pattern is formed in the secondary backing and the force required to stretch the carpet composite one-half percent is decreased to less than 70 percent of the force required prior to the embossing step.

2. A process of claim 1 wherein the secondary backing is embossed by passing the carpet composite through a nip formed by an embossing roll and a back-up roll, the secondary backing contacting the embossing roll in the nip.

3. A process of claim 2 wherein the temperature is in the range of 90° to 200° C., the nip load is in the range of 90 to 1800 newtons per centimeter and the composite is passed through the nip at a speed in the range of 0.5 to 40 meters per minute.

4. A process of claim 1 wherein the secondary backing is embossed by passing the composite through two nips formed by an embossing roll and two back-up rolls located about 180 degrees apart with respect to the embossing roll surface, the secondary backing contacting the embossing roll in each of the nips and each of the nips being unheated.

* * * * *